United States Patent
Ibe et al.

(10) Patent No.: US 6,398,415 B1
(45) Date of Patent: Jun. 4, 2002

(54) BEARING DEVICE USING FELT MEMBER AND METHOD OF MANUFACTURING SAME

(75) Inventors: Hiromitsu Ibe, Kosai; Hisashi Sakakibara, Toyohashi; Shigeru Morishita, Kosai; Kazushi Gotou, Toyohashi; Yousuke Natsume, Toyohashi; Hiroto Kawai, Toyohashi, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/537,772

(22) Filed: Mar. 30, 2000

(30) Foreign Application Priority Data

| Jul. 9, 1999 | (JP) | 11-195853 |
| Feb. 18, 2000 | (JP) | 2000-041624 |
| Feb. 24, 2000 | (JP) | 2000-047868 |

(51) Int. Cl.⁷ ............................................... F16C 33/66
(52) U.S. Cl. ................................................... 384/214
(58) Field of Search ............................ 384/214, 213, 384/902, 209, 208

(56) References Cited

U.S. PATENT DOCUMENTS 4,598,220 A * 7/1986 Stone
5,941,646 A * 8/1999 Mori et al.

* cited by examiner

Primary Examiner—Lenard A. Footland
(74) Attorney, Agent, or Firm—Law Office of David D. Posz

(57) ABSTRACT

A bearing device for a rotary shaft is comprised of a porous sliding bearing and a felt ring fit around the sliding bearing. The sliding bearing and the felt ring are filled with lubricant oil. The felt ring is made of needle-punching polypropylene fibers of 0.4–20 micrometers in diameter. The felt ring is manufactured by shaping the polypropylene fibers into a felt sheet, heat-treating the felt sheet to eliminate fuzz from the sheet surfaces, and punching the felt sheet in a ring shape. The sliding bearing has a plurality of grooves on its outer peripheral surface with which the felt ring contacts. Each groove is formed to extend in a horizontal direction to restrict the lubricant oil from flowing downward.

10 Claims, 6 Drawing Sheets

BEARING DEVICE USING FELT MEMBER AND METHOD OF MANUFACTURING SAME

CROSS REFERENCE TO RELATED APPLICATION

This application relates to and incorporates herein by reference Japanese patent Applications No. 11-195853 filed on Jul. 9, 1999, No. 2000-41624 filed on Feb. 18, 2000, and No. 2000-47868 filed on Feb. 24, 2000.

BACKGROUND OF THE INVENTION

The present invention relates to a bearing device for supporting a rotary shaft and a method of manufacturing a felt member used for the bearing device.

In some bearing devices, a sliding bearing and an annular felt ring are used to support a rotary shaft in the sliding bearing. The sliding bearing is made of a porous sintered alloy, and the felt ring is generally made of wool or polyester fibers. Lubricant oil is filled in the pores of the alloy and the felt. A cylindrical sliding bearing is held in position in a yoke of a motor. The felt ring is fit around the sliding bearing at the inside of the yoke. In this type of bearing device, the lubricant oil is allowed to move between the bearing and the felt ring.

The diameter of wool fibers varies between 10–70 micrometers ($\mu$m). If wool fuzz are scattered from the wool felt and affixed between the sliding bearing and the rotary shaft, unacceptable noise sound is generated at the sliding surface during rotation of the rotary shaft. This may occur even after a motor is checked in a production process, and lowers the reliability of the checking.

Further, during rotation of the rotary shaft, heat is generated due to friction between the rotary shaft and the sliding bearing. The lubricant oil in the sliding bearing expands and its viscosity is lowered. Thus, the lubricant oil spills out from the sliding bearing. The lubricant oil spilled out from the radially inner side enables smooth rotation of the rotary shaft, while the lubricant oil spilled out from the radially outer side is absorbed and reserved in the felt ring.

The lubricant oil excessively spills out from the sliding bearing, when the sliding bearing is excessively heated due to rotations of the rotary shaft at high speeds for a long period of time. In this instance, the felt ring made of wool or polyester fibers becomes incapable of absorbing all the spilled lubricant oil therein. As a result, the amount of lubricant oil reserved in the sliding bearing decreases, resulting in burn-out of the sliding bearing in a short period. The lubricant oil spilled out but not absorbed in the felt ring scatters and affixes to surrounding parts. In the case of an electric motor, the scattering oil affixes to a commutator of the motor, causing clogging of the commutator or unusual noise sound during sliding of brushes on the commutator.

It is proposed to form blocking surfaces at predetermined locations for restricting the lubricant oil from spilling out too much from the sliding bearing. However, this blocking surfaces require special machining process and counteracts to required spilling of the lubricant oil.

SUMMARY OF THE INVENTION

It is therefore an object of the present invention to provide a bearing device and a method of manufacturing a felt ring for such a bearing device, which are capable of reducing unacceptable noise sound.

It is another object of the present invention to provide a bearing device, which is capable of reducing lubricant oil scattering outside.

According to the present invention, a bearing device for a rotary shaft is comprised of a porous sliding bearing and a felt ring fit around the sliding bearing, so that lubricant oil filled in the sliding bearing is absorbed in and returned from the felt ring, respectively. The felt ring is made of needle-punching polypropylene fibers of 0.4–20 micrometers in diameter. Preferably, the fibers are long-staple shape. The felt ring is manufactured by shaping the polypropylene fibers into a felt sheet by needle-punching, heat-treating the felt sheet to eliminate fuzz from the sheet surfaces, and punching the felt sheet in a ring shape. The sliding bearing has a plurality of grooves on its outer peripheral surface with which the felt ring contacts. Each groove is formed to extend in a horizontal direction to restrict the lubricant oil from flowing downward.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
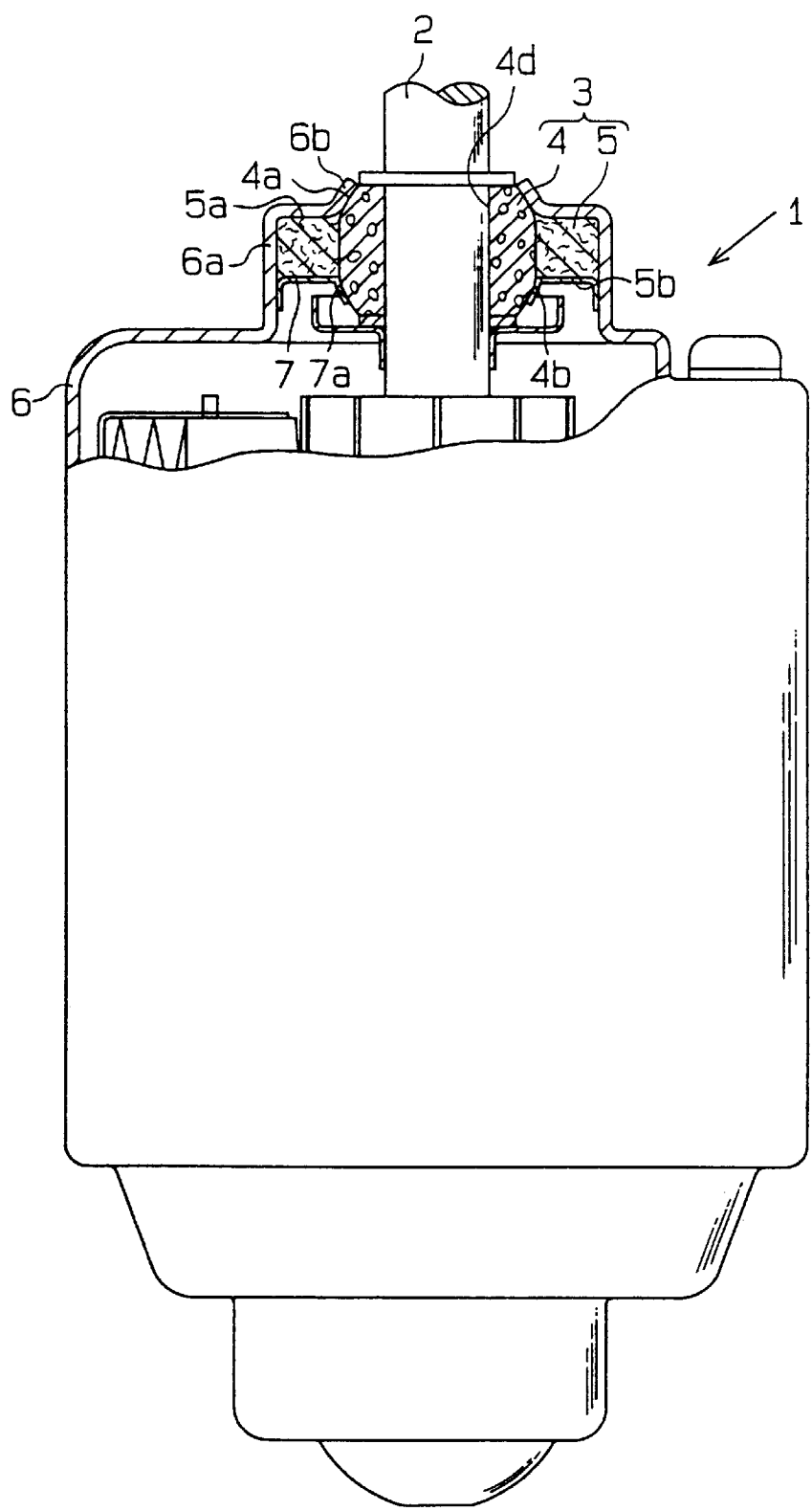
FIG. 1 is a partial sectional view showing an electric motor having a bearing device according to a first embodiment of the present invention.

The present invention will be described in detail with reference to embodiments, which are applied to an electric motor as shown in the accompanying drawings. In the drawings, the same reference numerals designate the same or like parts.

(First Embodiment)

Referring to FIG. 1, an electric motor 1 has a rotary shaft 2. The motor 1 has a bearing device 3 which rotatbly supports the rotary shaft 2. The bearing device 3 is comprised of a sliding bearing 4 and an annular felt ring 5.

The motor 1 has a cylindrical motor casing 6 which is unitarily formed with a cylindrical felt holder 6a and a spherical bearing holder (upper bearing holder) 6b. The felt holder 6a extends axially outward and is bent radially inward at its top end. The bearing holder 6b extends axially outward and radially inward from the felt holder 6a. An annular locking washer 7 is fit in the felt holder 6a. The locking washer 7 is formed unitarily with a spherical bearing holder (lower bearing holder) 7a. The bearing holder 7a extends axially inward and radially inward.

The sliding bearing 4 is interposed between the bearing holders 6b and 7a in a manner that it is held in position in the axial direction of the rotary shaft 2 and pressed radially inward to the rotary shaft 2. The felt ring 5 is disposed around the sliding bearing 4, and accommodated within a space defined by the felt holder 6a, locking washer 7 and the sliding bearing 4 in a manner that it is held in contact with the bearing 4.

The felt ring 5 is made of polyester-system fibers. The diameter of each polyester-system fiber is about 10 micrometers ($\mu$m). The upper and lower or axial end surfaces 5a and 5b of the felt ring 5 are heat-treated to be smooth and fuzzless. The felt ring 5 is filled with lubricant oil.

The sliding bearing 4 is made of a porous sintered alloy. The sliding bearing 5 is shaped generally cylindrically. It also has spherical parts 4a and 4b on its outer peripheries at both axial end sides to correspond to the bearing holders 6b and 7a. The sliding bearing 4, particularly its pores, is filled with the lubricant oil. The sliding bearing 4 is fit around the rotary shaft 2.

The bearing device 3 is manufactured as follows.

Figure 2A:
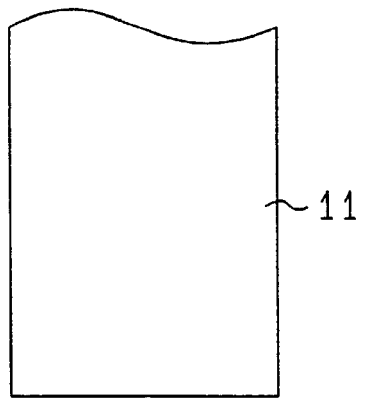
FIGS. 2A and 2B are schematic views showing a process of manufacturing a felt ring used in the bearing device according to the first embodiment.
Figure 2B:
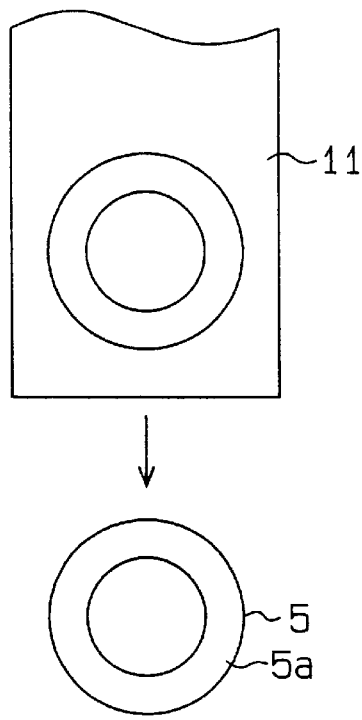

First, polyester-system fibers of about 10 $\mu$m diameters are needle-punched to a felt sheet 11 as shown in FIG. 2A. The felt sheet 11 is shaped in an elongated rectangular form sufficient to provide a number of felt rings from one sheet. The felt sheet 11 is heat-treated to have less fuzz thereon. Specifically, both planar surfaces of the felt sheet 11 are heated by a gas burner while being moved over the gas burner. Then, as shown in FIG. 2B, the felt ring 5 is punched out from the felt sheet 11 in the direction perpendicular to the planar surface. Thus, the felt ring 5 has its planar surfaces with the least fuzz.

The felt ring 5 is filled with the lubricant oil, and inserted into the felt holder 6a of the motor casing 6. The sliding bearing 4 is filled with the lubricant oil, and inserted into the felt ring 5. Then, the locking washer 7 is fit into the bearing holder 6a to hold the felt ring 5 and the sliding bearing 4 tightly in position. The rotary shaft 2 is fit into the central hole of the sliding bearing 4.

In the bearing device 3, the lubricant oil moves between or circulates through the sliding bearing 4 and the felt ring 5 while the motor 1 is in operation. Specifically, the felt ring 5 absorbs or reserves excess lubricant oil spilling out from the sliding bearing 4 to prevent scattering of the lubricant oil. The felt ring 5 also supplies the sliding bearing 4 with the reserved lubricant oil to prevent burn-out of the rotary shaft 2 and the sliding bearing 4.

The bearing device 3 as constructed above, particularly the felt ring 5, was tested. In this testing, fuzz (fibers) are affixed to a sliding surface 4d of the sliding bearing 4, that is, radially inner surface on which the rotary shaft 2 slides, and the rotary shaft 2 was rotated. Under this condition, ramming sound vibration levels was measured with respect to different diameters of the fibers. The ramming sound vibration level is defined in this testing as a parameter to determine the magnitude of noise sound. The noise sound is determined as acceptable and unacceptable if the measured level is less than 2 G and more than 2 G, respectively.

Figure 3:
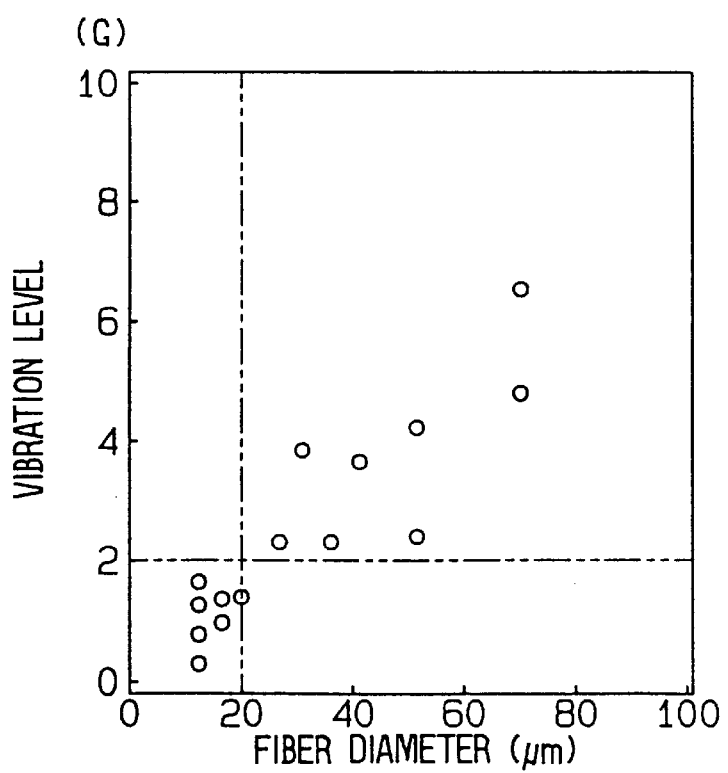
FIG. 3 is a graph showing a relation between fiber diameters and sound vibration levels measured in testing with respect to the first embodiment.

The test result is shown in FIG. 3. As understood from the figure, the noise sound level increased generally in proportion to the fiber diameter. The noise sound level was reduced to be less than 2 G (acceptable), if the fiber diameter was less than 20 $\mu$m. It was confirmed that the fiber diameter between 0.4 and 20 $\mu$m is preferred from the standpoint of the noise sound level and production.

From this test result, it is evident that the felt ring 5 made of fibers of 10 $\mu$m diameter does not produce unacceptable noise sound even if the fuzz of the felt ring 5 affix to the sliding surface 4d of the sliding bearing 4.

The first embodiment provides the following advantages.

(1) Unacceptable noise sound is restricted from being generated even if such fibers affix to the sliding surface 4d of the sliding bearing 4, because the felt ring 5 is made of fibers of about 10 $\mu$m diameter.

(2) The fuzz are restricted from being scattered from the axial end surfaces 5a and 5b and from being affixed to the sliding surface 4d, because the surfaces 5a and 5b are heat-treated to be fuzzless.

(3) The heat-treatment of the surfaces 5a and 5b is simplified, because the both surfaces 5a and 5b are planar and wide. Although the surfaces 5a and 5b are close to the sliding surface 4d of the sliding bearing 4, the fuzz are less likely to be affixed to the sliding surface 4d due to the fuzzlessness of the surfaces 5a and 5b.

(4) The heat-treatment is attained more easily than heat-treating the felt rings one by one, because the felt sheet 11 has a sufficient area and is heat-treated before the felt ring 5 is punched out one by one from the felt sheet 11.

(5) The lubricant oil is enabled to move to and from the sliding bearing 4, because the felt ring 5 is made of the polyester-system fibers by needle-punching.

The above first embodiment may be modified as follows.

The diameter of fibers may be other than 10 $\mu$m, as long as it is limited to 0.4–20 $\mu$m (0.03–1.0 Denier). The felt ring 5 may not be heat-treated, or only one of the surfaces 5a and 5b may be heat-treated. The radially inner and/or outer surfaces of the felt ring 5 may be heat-treated as well. The felt ring 5 may be heat-treated after being punched out from the felt sheet 11. The felt ring 5 may be made of other fibers such as rayon, acetate, polyamide, polyaramide, acryl, polyvinyl chloride, polyester, polypropylene, polyethylene, refractory fiber, carbon fiber, phenol fiber, or glass fiber, or composite of any of these materials. The bearing device 3 may be applied to any devices other than electric motors.

(Second Embodiment)

Figure 4:
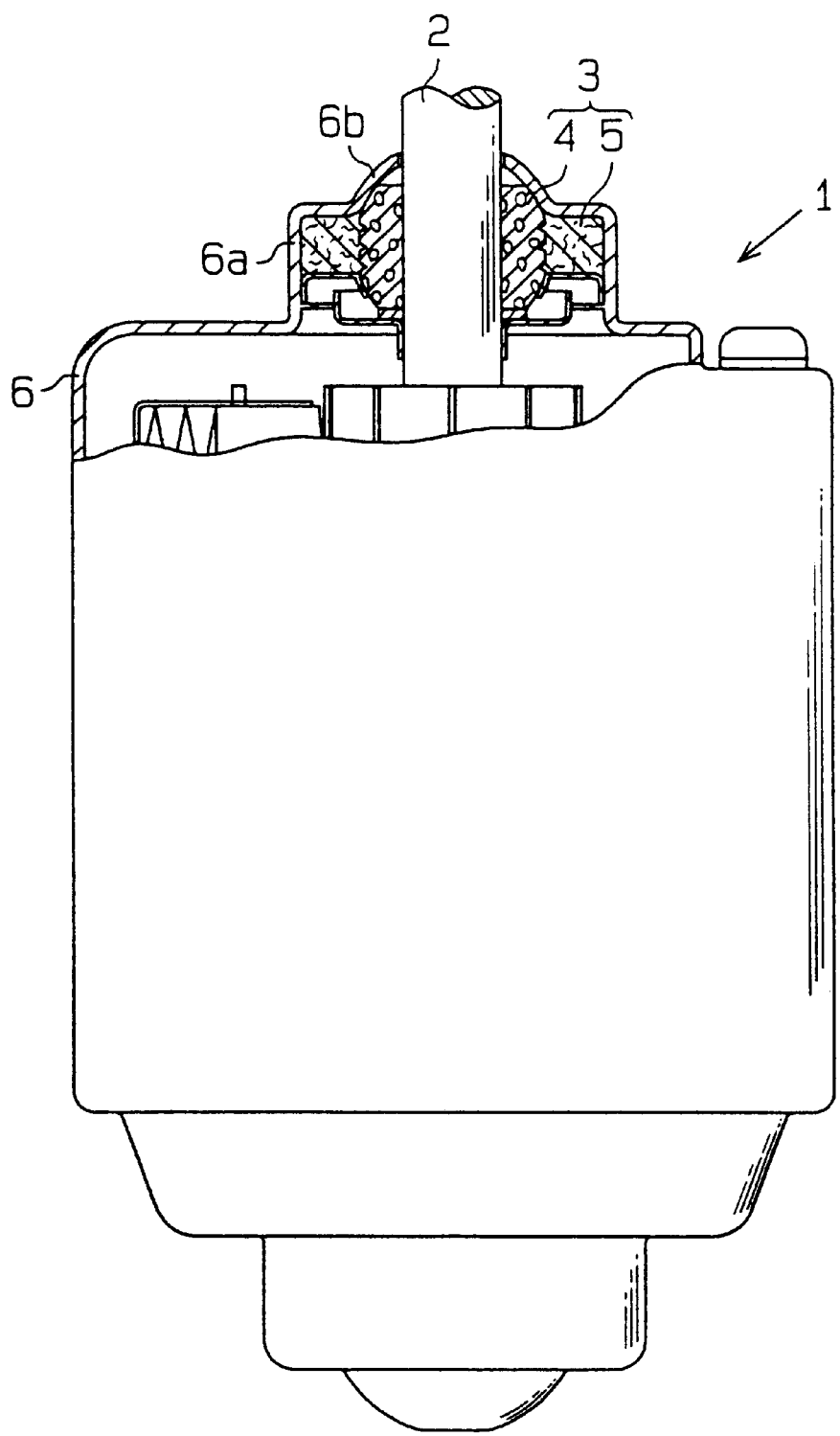
FIG. 4 is a partial sectional view showing an electric motor having a bearing device according to a second embodiment of the present invention.
Figure 5:
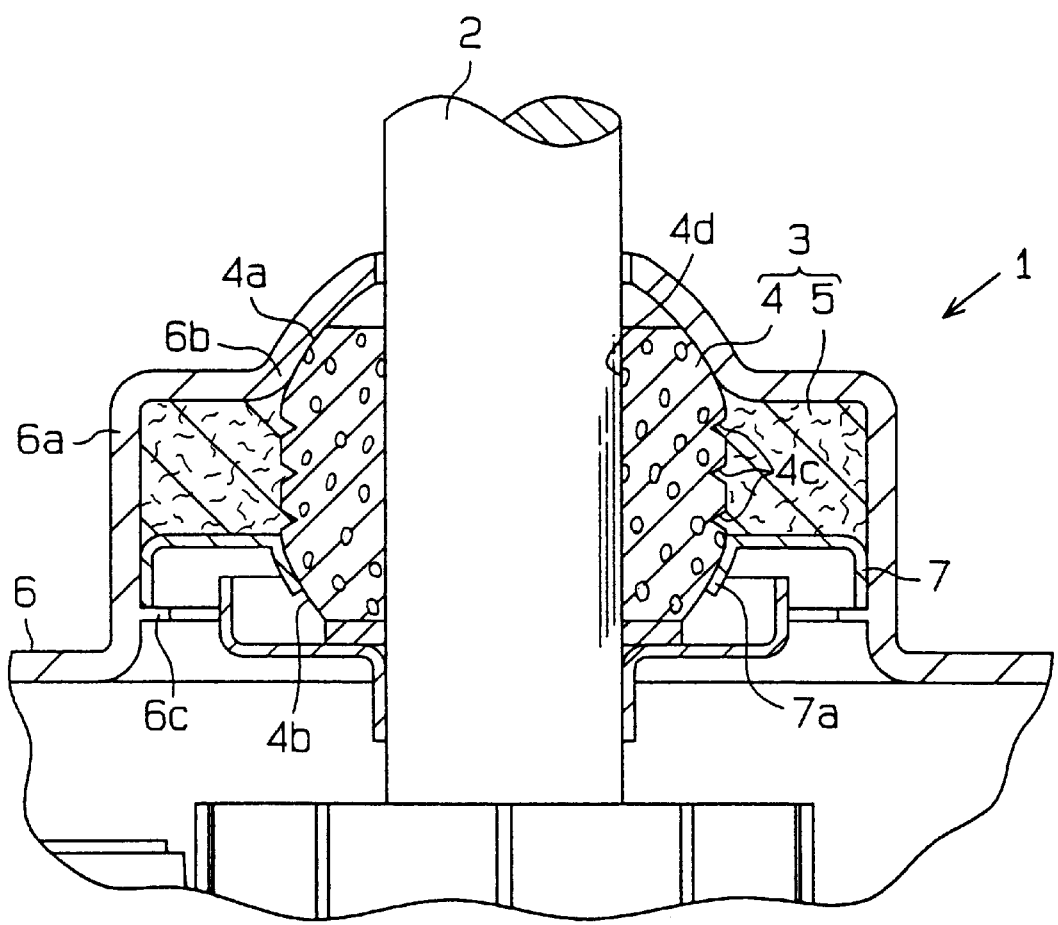
FIG. 5 is an enlarged sectional view of the bearing device according to the second embodiment.

In a second embodiment, the bearing device 3 is constructed in the similar manner as in the first embodiment as shown in FIGS. 4 and 5. In this embodiment, however, the casing 6 is formed with a step 6c protruding radially inward and annularly from the felt holder 6a. The step 6c contacts the locking washer 7 and restricts axial movement of the same.

The felt ring 5 is made of polypropylene fibers which are more lipophilic than the wool or polyester fibers. The polypropylene fibers have diameters of about 3 $\mu$m (0.05 Denier) and sufficiently long lengths. That is, the felt ring 5 is made of continuous polypropylene fibers.

Figure 6:
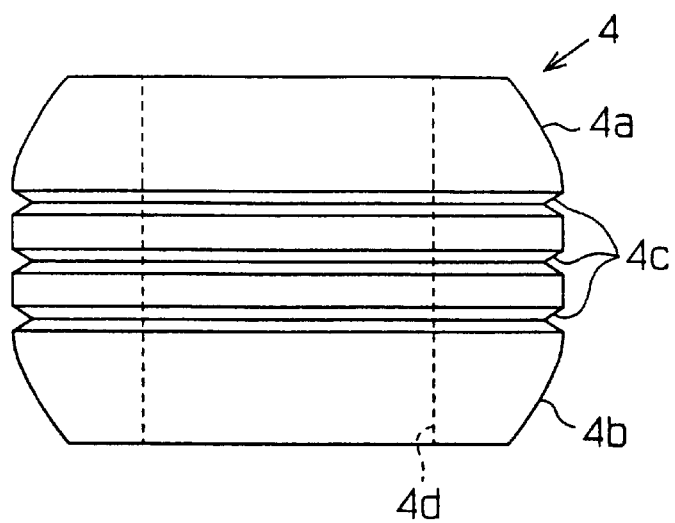
FIG. 6 is a side view showing a sliding bearing used in the bearing device according to the second embodiment.

The sliding bearing 4 is formed with a plurality of (for instance, three) grooves 4c on the axially central part of its outer peripheral surface, to which the felt ring 5 abuts, as shown in FIG. 6. Each groove 4c have a V-shape cross section, and extends circumferentially and horizontally in the case that the electric motor 1 is held upright. That is, the groove 4c is in the perpendicular relation to the rotary shaft 2. The Thus, the felt ring 5 is enabled to fit in the grooves 4c, so that the contact area between the sliding bearing 4 and the felt ring 5 may be increased than in the case of the first embodiment.

Various comparison tests were conducted on the bearing device 3 according to the second embodiment. In the following tests, a felt made of the polypropylene fibers and a felt made of wool of 15–50 μm were compared. In the tests, C-type polypropylene felt (product name) manufactured by TORAY CORPORATION of Japan was used as the polypropylene felt according to this embodiment, while W-1 wool-type felt (product name) manufactured by NAGOYA FELT CORPORATION was used as the wool felt. Anderoll-465 (product name) manufactured by ANDEROLL CORPORATION was used as lubricant oil.

In the first test, capacities of reserving lubricant oil per unit felt weight (1 gram) were compared. That is, the lubricant oil is dropped on each felt formed in the same shape and weight, and the amount of the dropped lubricant oil was measured until the lubricant oil flows out from the felt, that is, until the felt cannot reserve the dropped lubricant oil therein.

According to the measurement, 1 gram of polypropylene felt could reserve 7–9 grams of lubricant oil, while 1 gram of wool felt could reserve 2–3 grams of lubricant oil. Thus, it was proved that the polypropylene felt is far superior to the wool felt with respect to the oil reserving capacity.

In the second test, capabilities of returning the lubricant oil (capacities of supplying the lubricant oil) from each felt to various sliding bearings. B110-type, F330-type and F336-type oilless sliding bearings (product name) manufactured by MITSUBISHI MATERIAL CORPORATION of Japan were used as the sliding bearing.

In this test, each felt (1 gram) is filled with 2 grams of the lubricant oil and the sliding bearing containing no oil therein is placed on each felt. After twenty-two hours, oil containing rate of the sliding bearing was measured. The oil containing rate is defined as a rate of contained oil amount Co relative to a maximum oil containing amount (oil saturation amount) So, that is, as (Co/So)×100%.

According to the measurement, the oil containing rates of the B110-type bearing were 18–20% in the case of the polypropylene felt, and 4–5% in the case of the wool felt. The oil containing rates of the F330-type bearing were 45–50% in the case of the polypropylene felt, and 3–4% in the case of the wool felt. The oil containing rates of the F336-type bearing were 70–76% in the case of the polypropylene felt, and 35–40% in the case of the wool felt. Thus, it was also proved that the polypropylene felt is far superior to the wool felt with respect to the oil returning capability.

In the third test, oil holding or reserving capacities of the sliding bearing having the grooves 4c and a sliding bearing having no groove were compared. In this test, a sufficient amount of lubricant oil was filled in each sliding bearing and placed on a hot plate (heater plate). The sliding bearings were observed until these were heated up to 80° C.

According to this observation, the lubricant oil spilled like sweat in ball shape all over the outer peripheral surface and thereafter dropped in the case of the sliding bearing having no grooves and thereafter. The lubricant oil spilling from the sliding bearing stayed in the grooves 4c for some time period and thereafter dropped in the case of the sliding bearing 4 having grooves 4c. That is, the spilled oil dropped from the sliding bearing much later in the case of the latter than in the case of the former. Thus, it was also proved that the sliding bearing 4 having the grooves 4c is far superior to the sliding bearing with no grooves with respect to the oil holding capacity.

The second embodiment provides the following advantages.

(1) The lubricant oil spilling from the sliding bearing 4 is reserved effectively in the felt ring 5 even under high speed rotation condition of the rotary shaft 2, because the polypropylene is more lipophilic than wool and polyester fibers and more capable of holding the lubricant oil therein. Thus, the felt ring 5 reduces scattering of the lubricant oil spilling from the sliding bearing, and the reduction in amount of the lubricant oil in the sliding bearing 4 and the felt ring 5 is minimized thus prolonging the life of the bearing device. Further, clogging of the commutator by the lubricant oil and unusual noise sound of brushes are suppressed.

(2) The oil containing capacity and oil returning capacity are improved, because the felt ring 5 is made of polypropylene fibers of 3 μm in diameter.

(3) Fuzz of the felt ring 5 are minimized than in the case of wool felt or the like, because the felt ring 5 is made of long polypropylene fibers. As a result, the unusual noise sound arising from the fuzz affixing to the rotary shaft 2 is reduced.

(4) The contact area between the sliding bearing 4 and the felt ring 5 is increased due to the grooves 4c formed on the sliding bearing 4. The amount of lubricant oil absorbed in and returned from the felt ring 5 is increased to minimize scattering of the lubricant oil.

(5) The lubricant oil spilling out from the sliding bearing 4 is restricted from flowing downward in a short period of time, because the grooves are formed horizontally.

(6) The grooves 4c is formed in a simplified manner by machining the sliding bearing 4 while rotating the same around its central hole which defines the sliding surface 4d, because the grooves 4c are provided in the circumferential direction.

(7) The sliding bearing 4 is not required to contain a large amount of lubricant oil therein and both sliding bearing 4 and felt ring 5 may be sized small in the radial direction, because the felt ring 5 is capable of absorbing and returning more lubricant oil. Thus, the bearing device 3 is reduced in size, while maintaining a required lubrication performance.

(8) The felt ring 5 may be burned to be disposed of, because polypropylene fibers do not produce harmful gas when burned.

The second embodiment may be modified as follows.

Figure 7:
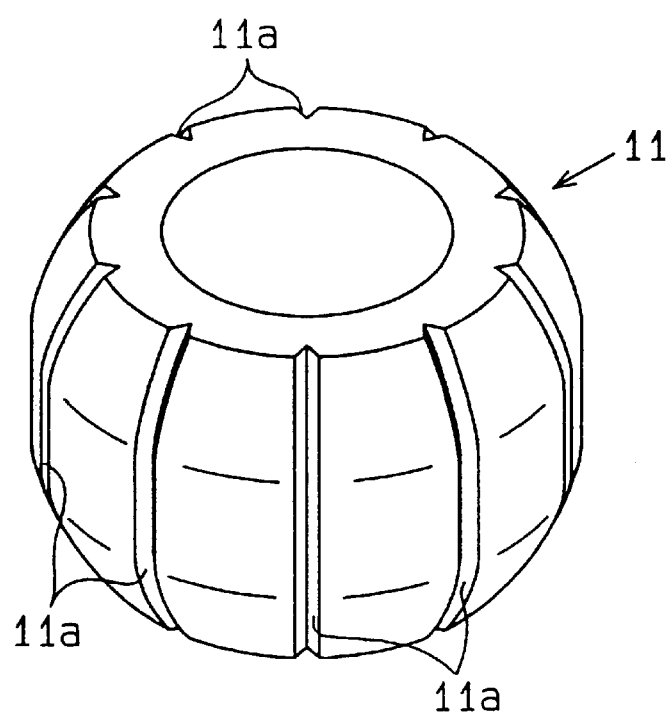
FIG. 7 is a perspective view showing a sliding bearing used in a bearing device according to a modification of the second embodiment.
Figure 8:
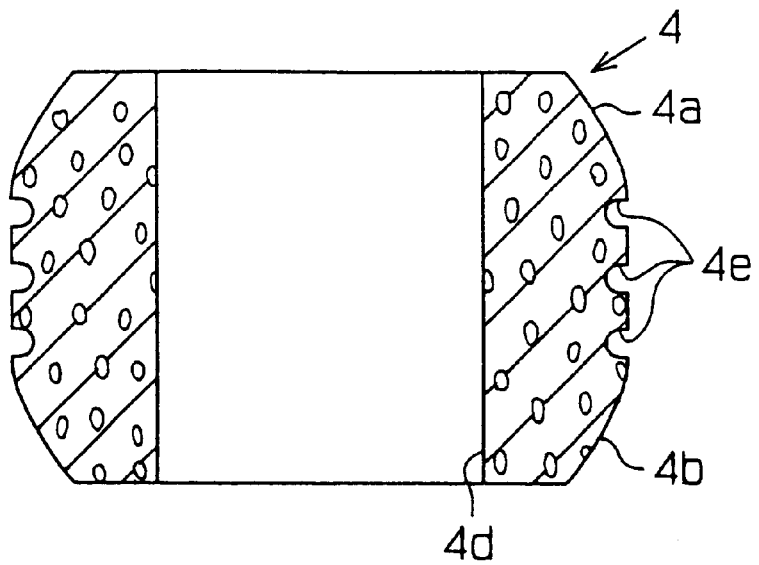
FIG. 8 is a sectional view showing a sliding bearing used in a bearing device according to a further modification of the second embodiment.
Figure 9:
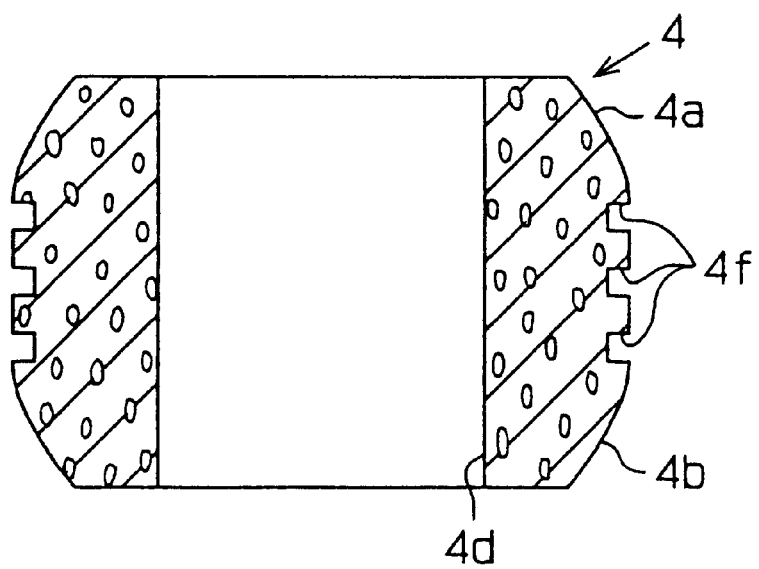
FIG. 9 is a sectional view showing a sliding bearing used in a bearing device according to a still further modification of the second embodiment.

The felt ring 5 may be made of short polypropylene fibers. The sliding bearing 4 may not have any grooves 4c. The sliding bearing 4 may be replaced with a sliding bearing 11 as shown in FIG. 7. This bearing 11 is formed with a plurality of grooves 11a which extend in the axial direction on its outer peripheral surface. The sliding bearing 4 may have grooves 4e and 4f which are U-shaped and square-shaped in section as shown in FIGS. 8 and 9, respectively. The felt ring 5 may be made of other fiber materials as long as polypropylene is included as the main component.

The present invention should not be limited to the above disclosed embodiments and modifications, but may be implemented in many other ways without departing from the spirit of the invention.

What is claimed is:

1. A bearing device for a rotary shaft comprising:
a sliding bearing made of a porous material and filled with lubricant oil to rotatably support a rotary shaft therein; and
a felt member held in abutment with the sliding bearing to receive and supply the lubricant oil from and to the sliding bearing, respectively,
wherein the felt member is made of a needle-punched felt, and fibers of the felt are 0.4–20 micrometers in diameter.

2. A bearing device for a rotary shaft comprising:

a sliding bearing made of a porous material and filled with lubricant oil to rotatably support a rotary shaft therein; and a felt member held in abutment with the sliding bearing to receive and supply the lubricant oil from and to the sliding bearing, respectively, wherein the felt member is made of a needle-punched felt, and heat-treated to have a fuzzless surface.

3. A bearing device a s set forth in claim 2, wherein:

the felt includes fibers which are 0.4–20 micrometers in diameter.

4. A bearing device as set forth in claim 2, wherein:

the felt member is shaped in a ring to have a radially inner surface abutting the rotary shaft t, and to have axial side surfaces at least one of which is heat-treated.

5. A bearing device as set forth in claim 4, wherein:

the fibers of the felt are polypropylene-system and about 10 micrometers in diameter.

6. A bearing device for a rotary shaft comprising:

a sliding bearing made of a porous material and filled with lubricant oil to rotatably support a rotary shaft therein; and a felt member held in abutment with the sliding bearing to receive and supply the lubricant oil from and to the sliding bearing, respectively, wherein the felt member is made of polypropylene fibers.

7. A bearing device as set forth in claim 6, wherein:

the polypropylene fibers are 0.4–20 micrometers in diameter.

8. A bearing device as set forth in claim 7, wherein:

the polypropylene fibers are in long-staple shapes and about 3 micrometers in diameter.

9. A bearing device as set forth in claim 6, wherein:

the sliding bearing has a groove on an outer peripheral surface which abuts the felt member.

10. A bearing device as set forth in claim 9, wherein:

the groove is formed to extend in a direction to restrict the lubricant oil from flowing downward.

* * * * *